US006591020B1

(12) United States Patent
Klassen

(10) Patent No.: US 6,591,020 B1
(45) Date of Patent: Jul. 8, 2003

(54) ANTIALIAZED HIGH-RESOLUTION FRAME BUFFER ARCHITECTURE

(75) Inventor: R. Victor Klassen, Webster, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/219,833

(22) Filed: Dec. 23, 1998

(51) Int. Cl.⁷ .................................................. G06K 9/40
(52) U.S. Cl. ........................ 382/269; 382/305; 382/173; 382/266
(58) Field of Search ................................. 382/269, 254, 382/266, 302, 305, 173, 176, 178

(56) References Cited

U.S. PATENT DOCUMENTS

| 5,123,085 A | 6/1992 | Wells et al. | |
|---|---|---|---|
| 5,333,249 A | 7/1994 | Klassen | |
| 5,600,763 A | 2/1997 | Greene et al. | |
| 5,684,939 A | 11/1997 | Foran et al. | |
| 5,701,365 A | 12/1997 | Harrington et al. | |
| 5,737,455 A | 4/1998 | Harrington et al. | |
| 5,862,257 A | * 1/1999 | Sekine et al. | 382/199 |
| 5,867,614 A | * 2/1999 | Ito | 382/305 |

OTHER PUBLICATIONS

Lin, et al., "An Anti–Aliasing Method for Parallel Rendering," Computer Graphics International, 1998. Proceedings Hannover, Germany Jun. 22–26, 1998, Los Alamitos, CA, USA, IEEE Comput. Soc., US, Jun. 22, 1998, pp. 228–235.

Lau, R. W. H., "An Adaptive Supersampling Method," Image Analysis Applications and Computer Graphics. Third International Computer Science Conference 1995. Proceedings, of 3rd International Computer Science Conference Image Analysis Applications and Computer Graphics, Hong Kong, 11–13, pp. 205–214.

Painter, et al., Antialiased Ray Tracing by Adaptive Progressive Refinement,: SIGGRAPH 1989. Conference proceedings, Boston, MA, USA, Jul. 31–Aug. 4, 1989, vol. 23, No. 3, pp. 281–288.

Whitted, T., "Improved Illumination Model for Shaded Display," Communications of the Association for Computing Machinery, Association for Computing Machinery. New York, USA, vol. 23, No. 6, Jun. 1980, pp. 343–349.

* cited by examiner

Primary Examiner—Thomas D. Lee
(74) Attorney, Agent, or Firm—Fay, Sharpe, Fagan, Minnich & McKee, LLP

(57) ABSTRACT

A system processes a color image. A high-resolution cache stores high-resolution data. A low-resolution memory, electrically connected to the high-resolution cache, stores low-resolution data. The low-resolution memory is capable of storing at least as much data as the high-resolution cache. An image processor, connected to both the high-resolution cache and the low-resolution memory, receives sequential segments of low-resolution and antialiased image data. As the image processor receives a current segment of the image data, the image processor either 1) transmits the current segment of image data to the low-resolution memory or 2) transforms the current segment to high-resolution data and transmits the high-resolution data to the high-resolution cache.

21 Claims, 7 Drawing Sheets

ANTIALIAZED HIGH-RESOLUTION FRAME BUFFER ARCHITECTURE

BACKGROUND OF THE INVENTION

The present invention relates to processing images and, in particular, to processing color images in a page description language environment. It finds particular application in conjunction with processing color images including graphical objects having at least one abutting and/or overlapping edge, and will be described with particular reference thereto. It will be appreciated, however, that the invention will also find application in processing images including text and graphical images in other arrangements, and the like.

The use of graphics in computer and communication applications is very widespread and is becoming increasingly more prevalent. A computing device often transmits a document including graphical data to a printing device using a page description language. Page description languages (e.g., the PostScript® language) include interpretive programming commands useful for implementing powerful graphics capabilities. When transmitted via a page description language, graphical data is typically first converted to a bit-map data file. Printing devices then convert the bit-map data to appropriate marks on paper.

The PostScript® page description language ("PostScript") uses what is known as a painter's algorithm. In other words, when objects are processed using PostScript, the objects are processed in back to front order. More specifically, objects in the lowest "layer" of the image are processed first. Then, objects in successively higher layers are processed.

Objects, as commonly described in page description languages, generally fall into one of three classes. The most common objects are text. These are received by the rasterizer as records that contain character, font, size and placement information. These records are converted to bitmaps, which are used to mask the current color when combining them with the existing image. The bits in the mask that are "on" correspond to pixels in the image, which are replaced with the current color; bits that are "off" correspond to pixels that are left unchanged. Generally speaking, text must be rasterized at a high resolution. However antialiasing (described below) makes it possible to rasterize text at a moderate resolution. Color precision is of relatively little importance in text: 16–32 shades of gray is generally sufficient.

A second type of object is commonly known as a pictorial image. Such an object is received as a collection of pixel intensity values (possibly color), along with position and transformation information. The object's size and shape may be altered by the transformation (e.g., it may be rotated and sheared). Generally speaking, pictorial objects are acceptably rasterized by receiving and printing them at a relatively low (300 spots per inch ("spi") or less) resolution. Color precision, on the other hand, is relatively important for pictorials. 100–200 shades of gray (or of each of red, green and blue) is often considered a minimum for acceptable color pictorials.

The third type of object is known as synthetic graphics. Such objects are received in the form of a series of vertices describing an outline, the interior of which is to be filled with the current color. When successive synthetic graphics objects of similar colors abut, the appearance of gradual gradations may result. Alternatively, when abutting objects exhibit sharply contrasting colors, the appearance of high contrast edges may result. It is important to provide high color precision in regions of gradual gradations, while providing the appearance of high quality, high resolution at high contrast edges.

When the image is printed, the objects are arranged one on top of another on a page. An object in a higher layer will partially, or even completely, cover an object in a lower layer. Alternatively, the two (2) objects may abut one another. When printed, the edges between the overlapping or abutting objects may appear jagged. Therefore, it is often desirable to antialias these edges.

Antialiasing provides the illusion of increased resolution without incurring the costs associated with increased memory and/or increased device resolution. Processing costs are only slightly increased by antialiasing and, in some cases, are actually decreased. Costs associated with devices capable of displaying higher resolution are also avoided since antialiasing is appropriate for displaying higher-resolution data on a lower-resolution device.

The most notable improvements provided by antialiasing occur on slightly slanted lines and edges, and near the horizontal and vertical portions of gradual curves. When printed at lower resolutions without being antialiased, these features often times appear jagged. Strokes may be of any color, and edges may separate any two (2) colors. However, the most visible jagged edges are often between colors having high luminance contrast.

The tradeoffs and benefits of antialiasing depend on the resolution achievable by the final output device. Early laser printers, despite only having a capability of printing low resolution images, in many cases produced edges that appeared smooth. As xerographic technology has advanced, laser copying has become crisper, thereby producing edges that are more cleanly defined. However, one drawback to such an improvement is an increased sharpness of the edges in the image. More specifically, the sharpened edge definition makes jagged edges caused by rasterization more visible.

One approach to removing jagged edges is to increase the resolution and addressability of the output devices even further. Hence, 1,200 spot per inch printers have been developed. Depending on the contrast of the edge (which depends on the whiteness of the paper, the blackness of the ink or toner, and the illumination), the human eye perceives jaggedness up to somewhere between 1,200 and 2,400 spots per inch (at a viewing distance of about 15 cm). However, it has been shown that with gray edges, resolutions from 300 to 600 spots per inch are sufficient. In pictorial images, these lower resolutions are sufficient, provided enough levels of gray are available. Therefore, antialiasing provides a good way to represent graphical edges so that invisible information is not stored.

There are a number of known approaches to antialiasing. The simplest and best known approach is to rasterize at a higher-than-final resolution. The final image is then computed by filtering and scaling-down the high-resolution version to a low-resolution image (i.e., the final image). This method is known as supersampling. The filtering and scaling operations consist of, at each output pixel, taking an average (possibly weighted) of the pixels in the region of the high-resolution image which maps to the region of the final image surrounding that output pixel's center.

Some advantages to this approach are that it is simple and can be implemented very rapidly on almost any system. However, this approach has at least one significant drawback over other approaches. Specifically, it may substantially increase the amount of time and memory required to antialias an image.

If the image is scaled by a factor of n (e.g., 4) (which gives n extra edge positions), nxn times as much memory is used, or at least accessed, and the processing time is substantially increased. Because memory access time (especially for large quantities of memory) has not historically decreased nearly as rapidly as processor cycle time, memory access time tends to dominate total run time. Thus, the cost of supersampling increases with resolution, in proportion to the amount of memory used.

Substantially more complex methods of antialiasing exist in which the full geometry in the region of each pixel is used to compute analytically either the weighted or unweighted average. In terms of runtime complexity, the more complex methods are better than the filtering and scaling-down method described above. Furthermore, the more complex methods theoretically give better results. However, the more complex methods are also typically more difficult to implement.

The Scitex continuous tone-line work ("CT-LW") format is useful for representing pictorials. Scitex stores the CT-LW as "run lists". Each run list represents data for the image in a first dimension (e.g., along an x-dimension). Multiple run lists are created to represent the data in a second dimension (e.g., along a y-dimension). The data for each run is stored as a first number identifying the color and as a second number identifying a length of the run. If it becomes desirable to antialias an image, the Scitex method performs the equivalent of nxn supersampling by increasing the precision of the run lengths (in the x-dimension) and by increasing the number of run lists (in the y-dimension). Such an approach reduces the processing cost to a factor of n over doing nothing.

Another approach to antialiasing is to use alpha-blending. In alpha-blending, only a low-resolution frame buffer is used to store the image. As each new primitive (e.g., object) is added to the frame buffer, it is immediately merged with existing data already in the frame buffer. In interior regions of an object, the merge is simply a replacement (i.e., the new data replaces the original data). In exterior regions of an object, the frame buffer is unaffected. Along an edge of an object, the fractional coverage of a pixel by the new object is computed. The color of the new object is blended with the existing color data in the frame buffer, using the computed fractional coverage, to control how much of each color is used in the antialiased pixel.

Alpha-blending is sufficient for text against a solid background, and probably for text against any background. However, it is generally not successful for abutting edges of polygons. FIG. 1 illustrates a pixel 10 of interest in a PostScript printing scheme. The pixel of interest 10 contains parts of first and second objects 12, 14, respectively, which abut each other at a common edge 16. The first object 12 is a first color and the second object 14 is a second color. The first and second colors are represented in FIG. 1 as horizontal and vertical lines, respectively.

The pixel of interest 10 shown in FIG. 1 is one of many pixels that may be used to make up a sweep or vignette. As is common in PostScript masters, the vignette is created from many abutting rectangles, of only slightly varying color.

FIG. 2 illustrates the desired antialiased final pixel 20, which would result from alpha-blending the pixel of interest illustrated in FIG. 1. The color of the desired final pixel 20 represents a blend of respective amounts, which are proportional to the fractional coverage, of the first and second colors in FIG. 1. The color of the desired final pixel 20 is represented in FIG. 2 as diagonal lines from the bottom-left to the top-right.

FIG. 3 illustrates the actual antialiased pixel 22 which would result from the pixel of interest 10 in the PostScript printing scheme shown in FIG. 1. The color of the actual pixel 22 is not consistent with the color of the desired final pixel 20 shown in FIG. 2. The color of the actual pixel 22 is represented in FIG. 3 as diagonal lines from the top-left to the bottom-right.

FIGS. 4A–4C illustrate the method by which alpha-blending is used to achieve the actual antialiased pixel 22 shown in FIG. 3. After the first object 12 is positioned on the page, the pixel of interest 10 partially covers the first object 12 and partially covers the background 24 (e.g., white). Therefore, the first object 12 is alpha-blended with the white background 24, yielding an intermediate pixel 26, which is illustrated with dashed lines in FIG. 4B. Then, the second object 14 is positioned on the page over the intermediate pixel 26 as illustrated in FIG. 4C. Alpha-blending is performed again for the intermediate pixel of interest 30. This time, the pixel of interest 30 includes the color from the second object 14 and the result from the first alpha-blending, yielding the pixel 22 shown in FIG. 3. Therefore, when alpha-blending is used with PostScript printing schemes, the actual color of the resulting pixel is a function of the colors of the objects and the background color, rather than only the colors of the objects.

The present invention provides a new and improved apparatus and method which overcomes the above-referenced problems and others.

SUMMARY OF THE INVENTION

An image, including at least two objects, is processed. All of a plurality of data for a first one of the objects is processed before any of a plurality of data for a second one of the objects is processed. To process the image, the following steps are performed for each of the data of each of the objects. Current antialiased data is received into a processing buffer. The current data is low-resolution data of a current section of the image. The current section is a part of a current object being processed. It is determined if the current section includes an edge of the current object. If the current section does not include the edge, the current low-resolution data is received into a low-resolution memory. If the current section does include the edge, it is determined if previous high-resolution data is included in a high-resolution memory. If the previous high-resolution data is included in the high-resolution memory and the previous high-resolution data corresponds to a previous section of a previously processed object having a same location within the image as the current section, the previous high-resolution data is merged with a high-resolution version of the current data. Then, the merged data is received into the high-resolution memory. If the previous high-resolution data is included in the high-resolution memory and the previous high-resolution data corresponds to a previous section of a previously processed object having a different location within the image as the current section, a low-resolution version of the previous high-resolution data from the high-resolution memory is received into the low-resolution memory. Then, original low-resolution data is received from the low-resolution memory into the processing buffer. The original low-resolution data corresponds to the same location within the image as the current section. A high-resolution version of the original low-resolution data is then merged with the high-resolution version of the current data. Lastly, the merged data is received into the high-resolution memory. If the previous high-resolution data is not included in the high-resolution memory, the high-resolution version of the current data is received in the high-resolution memory.

In accordance with one aspect of the invention, the step of receiving the current data includes identifying the current section of the current object to be processed and determining a current location identifier associated with the current section. The current location identifier identifies a position of the current section within the image.

In accordance with a more limited aspect of the invention, the step of determining if the current section includes the edge of the current object includes determining if the current low-resolution data includes a plurality of colors.

In accordance with another aspect of the invention, the step of receiving the current low-resolution data into the low-resolution memory includes determining a first memory location, within the low-resolution memory, as a function of the current location identifier and receiving the current low-resolution data into the first memory location of the low-resolution memory. The method further includes determining a second memory location, within the high-resolution memory, as a function of the current location identifier and, if the previous high-resolution data included in the second memory location corresponds to the same location within the image as the current location identifier, flagging the second memory location as invalid.

In accordance with a more limited aspect of the invention, the steps of determining the first and second memory locations includes using a hashing function.

In accordance with a more limited aspect of the invention, the step of determining if the high-resolution memory includes the previous high-resolution data includes determining if the second memory location within the high-resolution memory includes the previous high-resolution data.

In accordance with an even more limited aspect of the invention, the step of merging the previous high-resolution data with the high-resolution version of the current data includes alpha-blending the previous high-resolution data and the high-resolution version of the current data.

In accordance with another aspect of the invention, the step of receiving the merged data in the high-resolution memory includes storing the merged data in the second memory location of the high-resolution memory.

One advantage of the present invention is that the speed of antialiasing a PostScript image is increased.

Another advantage of the present invention is that the quality of antialiased PostScript images is increased.

Still further advantages of the present invention will become apparent to those of ordinary skill in the art upon reading and understanding the following detailed description of the preferred embodiments.

BRIEF DESCRIPTION OF THE DRAWINGS

The invention may take form in various components and arrangements of components, and in various steps and arrangements of steps. The drawings are only for purposes of illustrating a preferred embodiment and are not to be construed as limiting the invention.

DETAILED DESCRIPTION OF THE PREFERRED EMBODIMENTS

Figure 1:
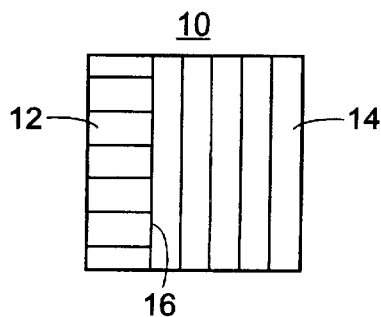
FIG. 1 illustrates a pixel of interest in a prior art PostScript printing scheme.
Figure 2:
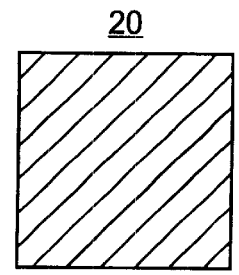
FIG. 2 illustrates the desired antialiased final pixel, which would result in the prior art system, from alpha-blending the pixel of interest shown in FIG. 1.
Figure 3:
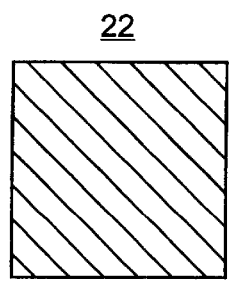
FIG. 3 illustrates the actual antialiased pixel, which would result in the prior art system, from the pixel of interest shown in FIG. 1.
Figure 4A:
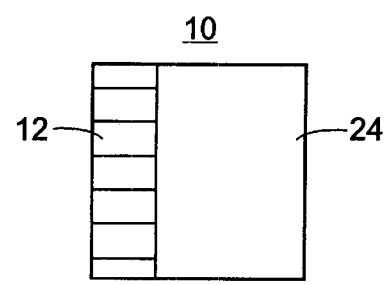
FIGS. 4A, 4B, and 4C illustrate the prior art alpha-blending method used to achieve the actual antialiased pixel shown in FIG. 3.
Figure 4B:
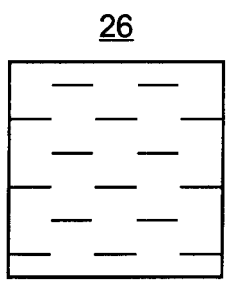
Figure 4C:
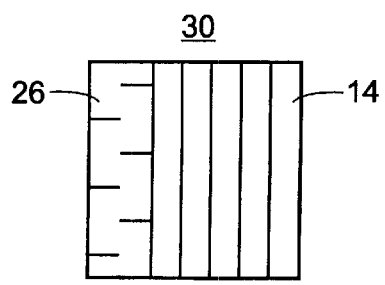
Figure 5:
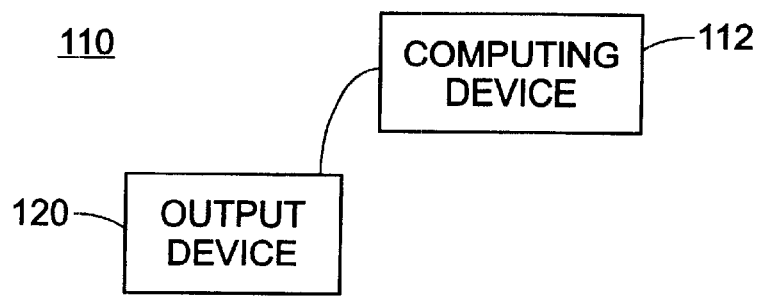
FIG. 5 illustrates a system for processing an image according to the present invention.
Figure 6:
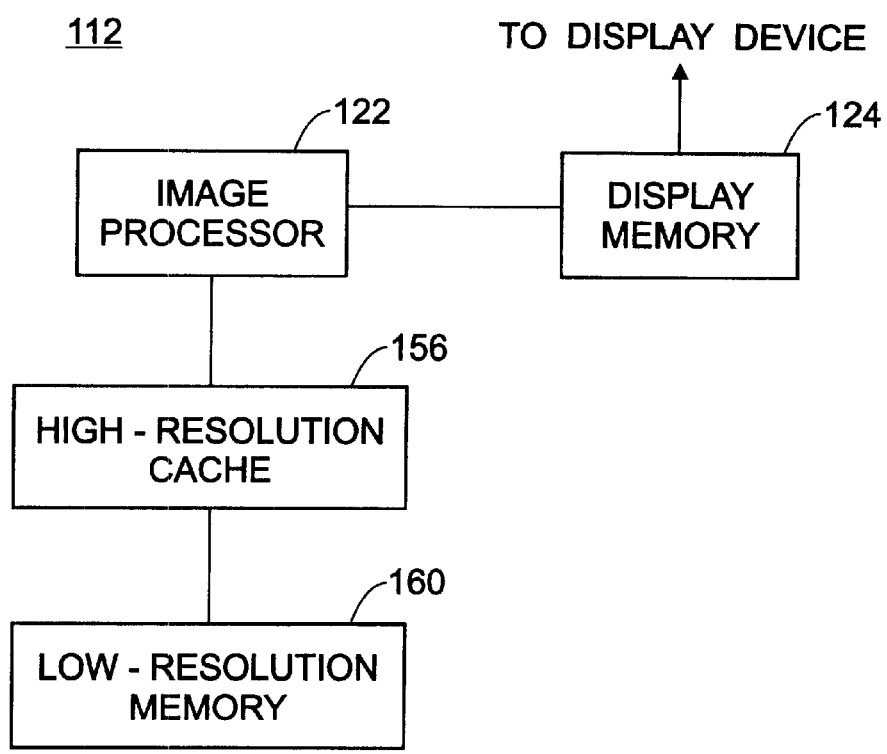
FIG. 6 illustrates components included within the computing device shown in FIG. 5.

FIG. 5 illustrates a system 110 for creating and processing an image from PostScript. The system 110 includes a computing device 112 to which an output device 120 is connected. In the preferred embodiment, the output device 120 is a color printing device. However it is to be understood that other output devices (e.g., a color facsimile machine) are also contemplated. FIG. 6 illustrates components within the computing device 112.

Objects within the image are processed from back to front. While the preferred embodiment describes receiving the image in the PostScript language, it is to be understood that other page description languages are also contemplated.

As described above, a description of a page contains one or more types of object: text, synthetic graphics, and pictorial. The following section describes processing of synthetic graphics.

As the image is rasterized, successive sections (e.g., pixels of interest) of the rasterized data are received, one after another, from the display memory 124 into the image processor 122. As each pixel of interest is received in the image processor 122, that segment of data is transformed into low-resolution, antialiased data. The antialiased data includes intermediate values along edges of objects within the image for providing the appearance of smoothness.

Figure 7:
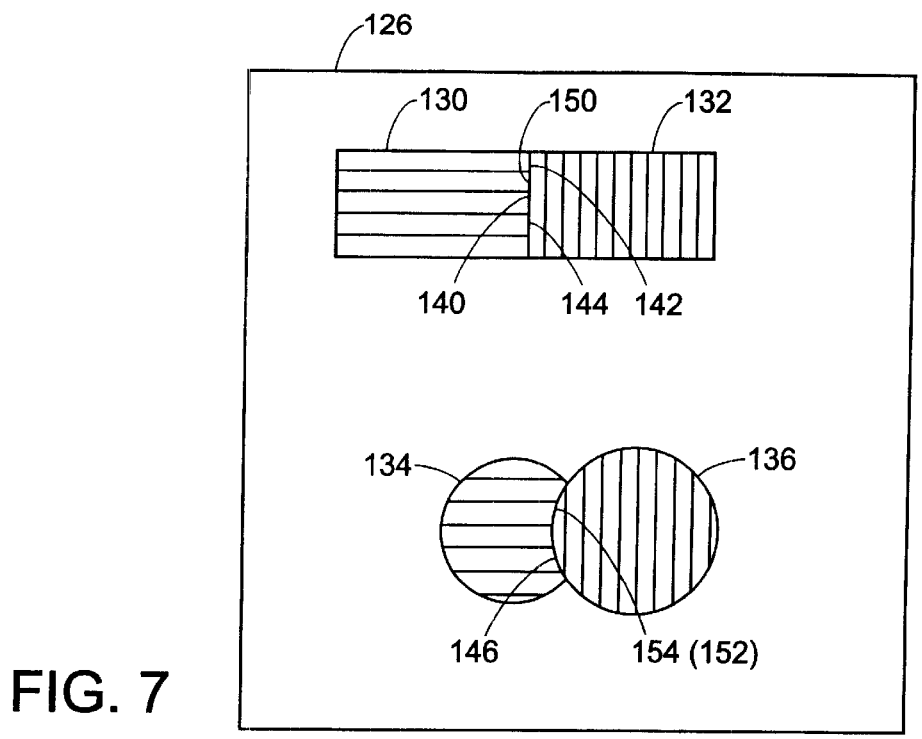
FIG. 7 illustrates an image to be processed according to the present invention.

FIG. 7 illustrates an image 126 to be processed according to the method of the present invention. The image 126 includes four objects 130, 132, 134, 136. As described above, each of the objects 130, 132, 134, 136 in the image 126 is processed one after another. Within the image 126 shown in FIG. 7, two (2) of the objects 130, 132 are first and second rectangles, respectively, having edges 140, 142 that abut each other. Because the two (2) edges 140, 142 abut, they are referred to as a common edge 144. The other two (2) objects 134, 136 are circles that overlap one another. A common edge 146 between the lower and upper circles 134, 136, respectively, follows the contour of the upper circle 136.

The first rectangle 130 and the lower circle 134 include a first color, which is illustrated by horizontal lines. The second rectangle 132 and the upper circle 136 include a second color, which is illustrated by vertical lines.

The common edge 144 between the two (2) rectangles 130, 132 and the common edge 146 between the two (2) circles 134, 136 include a plurality of pixels. It is not uncommon for one or more of the pixels along the common edges 144, 146 to partially cover both the first and second rectangles 130, 132 and/or both the lower and upper circles 134, 136, respectively. In other words, it is not uncommon that both the first and second colors partially cover one or more of the pixels along the common edges 144, 146.

Figure 8:
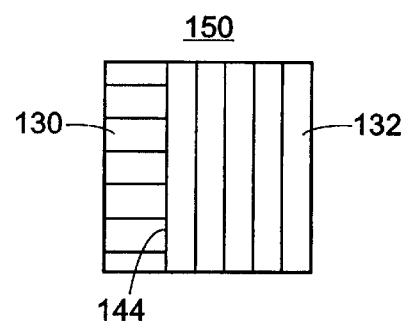
FIG. 8 illustrates a pixel of interest including an edge between the two (2) rectangles shown in FIG. 7.

FIG. 8 illustrates an enlarged view of a pixel of interest 150 showing the common edge 144 between the two (2) rectangles 130, 132. The pixel of interest 150 is partially covered by both the first and second colors.

Figure 9:
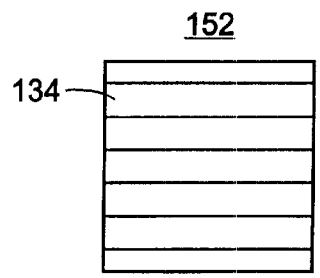
FIG. 9 illustrates a pixel of interest of the lower circle shown in FIG. 7.
Figure 10:
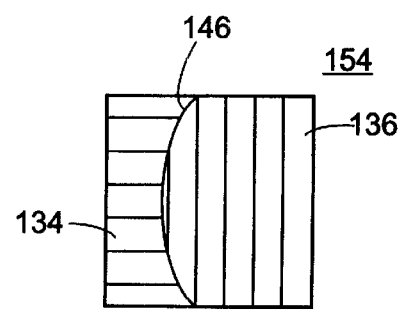
FIG. 10 illustrates a pixel of interest including an edge between the upper and lower circles shown in FIG. 7.
Figure 11A:
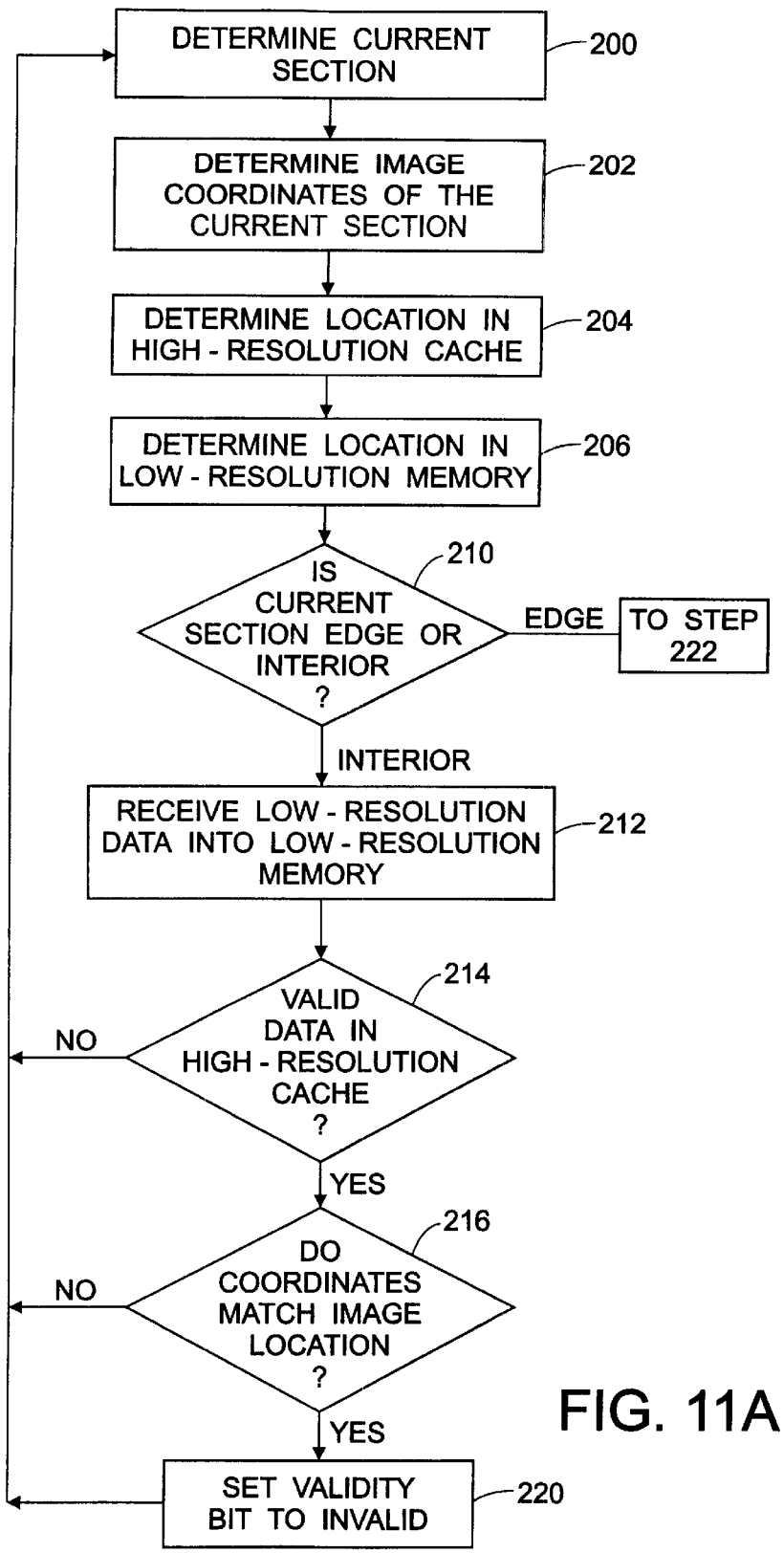
FIGS. 11A, 11B, and 11D illustrate a flow-chart of the method for processing an image according to the present invention.
Figure 11B:
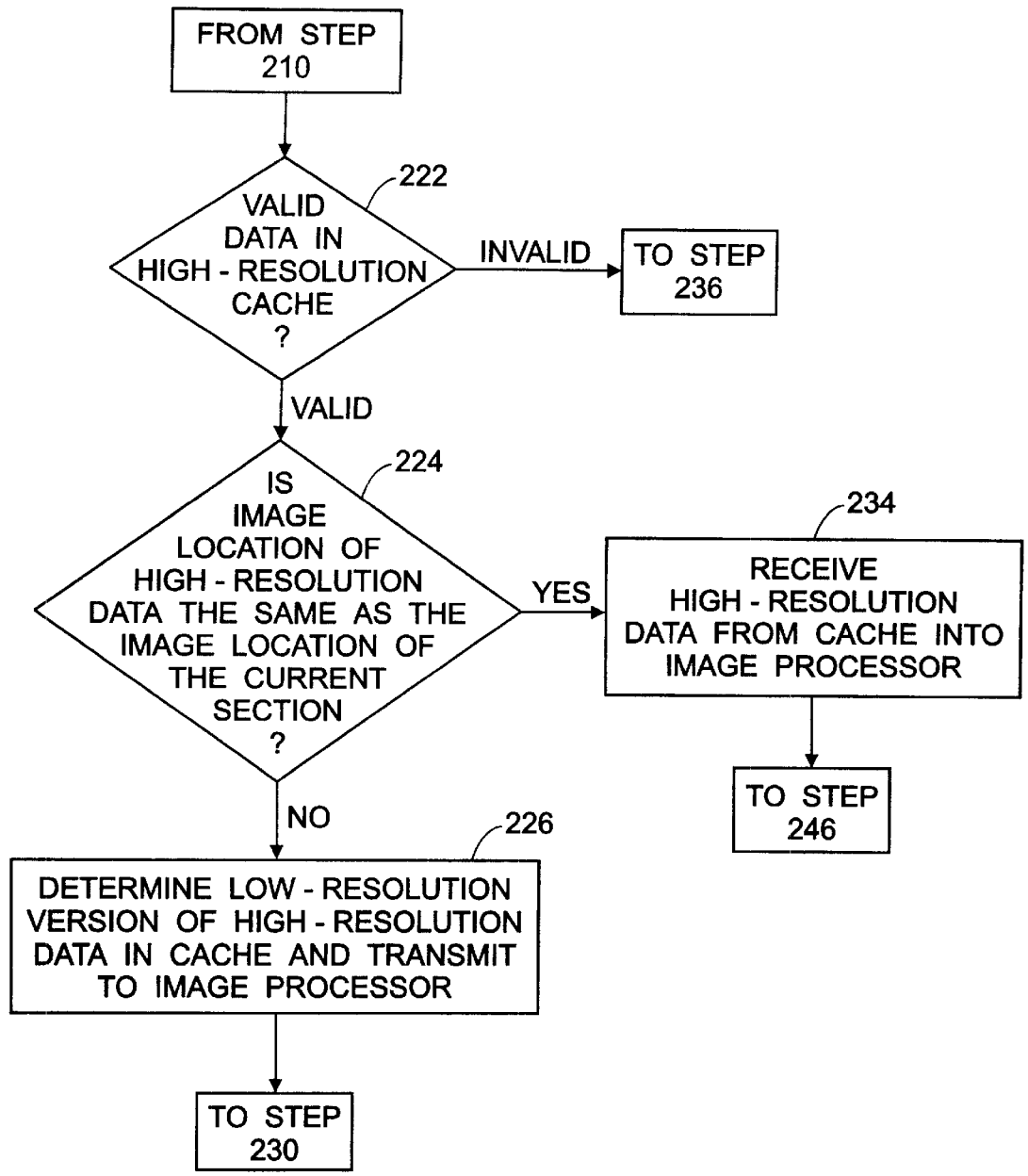
Figure 11C:
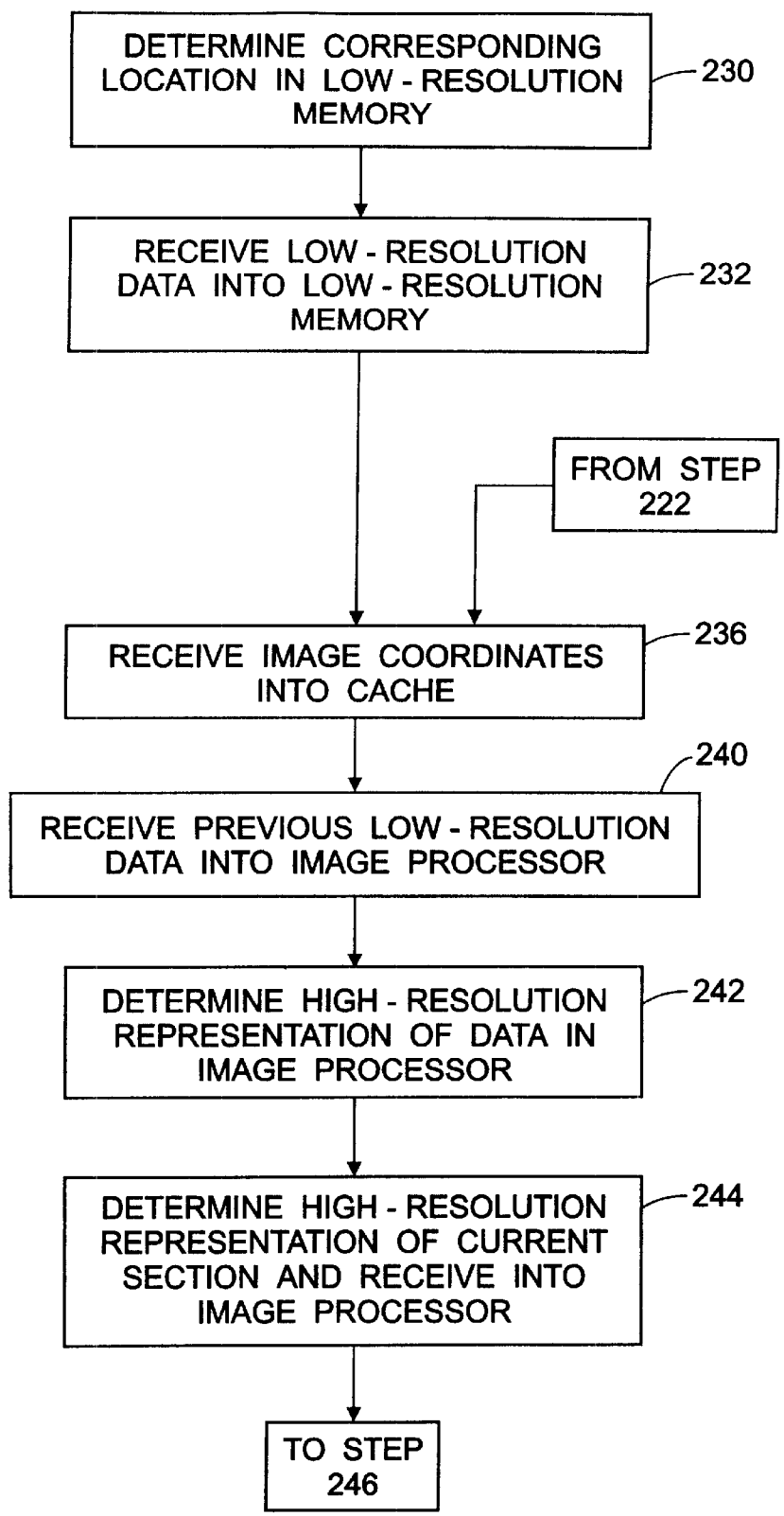
Figure 11D:
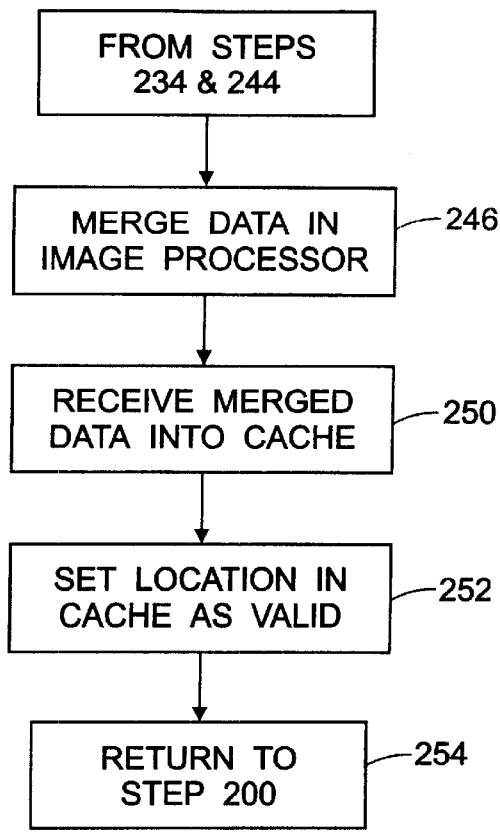

FIG. 9 illustrates an enlarged view of a pixel of interest 152 from the lower circle 134. FIG. 10 illustrates a pixel of interest 154 from the common edge 146 between the lower and upper circles 134, 136, respectively. The pixel of interest 152 shown in FIG. 9 is directly below the pixel of interest shown in FIG. 10. In other words, the pixel of interest 152 shown in FIG. 9 is positioned at the same image location within the image 126 as the pixel of interest 154 shown in FIG. 10. However, the pixel of interest 152 shown in FIG. 9 is rasterized earlier than the pixel of interest 154 shown in FIG. 10. Therefore, the pixel of interest 152 is merely indicated in FIG. 7 within parentheses.

With reference to FIGS. 5–11D, the system 110 determines a current section of the image 126 in a step 200.

Image coordinates of the current section within the image 126 are determined in a step 202. Respective locations within a high-resolution cache 158 and a low-resolution memory 160, which correspond to the image coordinates, are determined in steps 204 and 206, respectively. The high-resolution cache 156 and low-resolution memory 160 are both included within the computing device 112.

The size of the low-resolution memory 160 is at least large enough to store a low-resolution representation of the entire image 126. The size of the high-resolution cache 156 may be adjusted according to different applications. More specifically, the high-resolution cache 156 is at least large enough to store data representing a high-resolution version of a single section of the image 126. Alternatively, the size of the high-resolution cache 156 is large enough to store enough data for a high-resolution version of the entire image 126. In the preferred embodiment, however, the high-resolution cache 156 is large enough to store high-resolution data for 1–3 rasterized scanlines of the image 126.

Because the low-resolution memory 160 is capable of storing an entire low-resolution version of the image, there is a one-to-one correspondence between locations within the low-resolution memory and the image 126. In other words, x- and y-coordinates calculated in the step 202 are preferably used to indicate a location in the image 126 and in the low-resolution memory 160. However, because the high-resolution cache 156 is preferably much smaller than the image 126, a hash function is used to determine locations within the high-resolution cache 156 that correspond to locations within the image 126.

In the preferred embodiment, the hash function used to determine a location in the high-resolution cache 156 corresponding to the image location determined in the step 202 is 2x+3y. Therefore, once the location of the current section (i.e., the pixel of interest) is determined within the image 126, the x-coordinate and the y-coordinate of the image location are substituted into the hash function to determine the corresponding location within the high-resolution cache 156.

As is commonly practiced in the art, rasterization algorithms operate on objects in order from one edge to another along a scanline before proceeding to the next scanline. Thus on a given scanline, first one edge is processed. Then zero or more interior pixels are processed. Finally the other edge is processed. By the nature of the algorithm, it is clear whether an edge or interior pixel is being processed.

For example, if the pixel of interest currently being processed is that shown in either FIG. 8 or FIG. 10, the pixel represents an edge of an object. If, on the other hand, the pixel of interest currently being processed is that shown in FIG. 9, the pixel represents an interior of an object. Unlike the pixels illustrated in FIGS. 8 and 10, the pixel illustrated in FIG. 9 only includes a single color.

A determination is made in step 210 as to whether the current section represents an interior or an edge of the object currently being processed.

If the pixel of interest represents an interior of the object currently being processed, low-resolution data representing the pixel of interest is received into the location, which corresponds to the current section of the image 126, within the low-resolution memory 160, in a step 212.

Next, in a step 214, a determination is made as to whether the location within the high-resolution cache 156, which corresponds to the current image location, includes valid data. Each "location" within the high-resolution memory includes several segments of data. More specifically, one segment contains the high-resolution data (typically sixteen bits), another segment contains the x-coordinate and the y-coordinate of the image location associated with the high-resolution data, and another segment contains a validity bit. The validity bit indicates whether the high-resolution data stored in a particular location is valid. Therefore, the determination in step 214, as to whether the data stored in the corresponding location of the high-resolution cache 156 is valid, is made by examining the validity bit. In the preferred embodiment, it is to be understood that each of the validity bits in the high-resolution cache 156 is set to "invalid" before an image is processed.

If the high-resolution data at the corresponding location is valid, the x- and y-coordinates of the high-resolution data are examined, in step 216, to determine if they match the x- and y-coordinates of the current image location of the current section. If the coordinates in the cache 156 do match the coordinates of the current image location, the high-resolution data stored in the cache 156 corresponds to a previously rasterized layer of the image 126. For example, the data could correspond to the portion of the lower circle 134 that is covered by the upper circle 136. Therefore, the validity bit in the cache 156 is set to "invalid" in a step 220.

If the high-resolution data at the corresponding location is invalid, and/or if the coordinates in the cache 156 do not match the coordinates of the current image location, the validity bit is not changed.

At this point, if the pixel of interest currently being processed represents an interior of an object, processing is returned to step 200 to process the next current section, if all the sections of the image 126 have not been processed. If the pixel of interest represents an edge of an object currently being processed, a determination is made in step 222 as to whether the location within the high-resolution cache 156, which corresponds to the image location of the current section, includes valid data from a previously processed section of the image 126.

If it is determined in the step 222 that the data already in the high-resolution cache 156 is valid, step 224 determines if the image location of the valid data in the high-resolution cache 156 corresponds to the image location of the current section. More specifically, the image location corresponding to the high-resolution data in the cache 156 is determined by examining the x-coordinate and the y-coordinate associated with the high-resolution data. Those x- and y-coordinates are then compared with the x- and y-coordinates of the current section, which were calculated in step 202.

If the image location of the high-resolution data in the high-resolution cache 156 does not match the image location of the current section, a low-resolution representation of the high-resolution data stored in the cache 156 is determined in a step 226, and the low-resolution version of the data is received in the image processor 122. Then, a location within the low-resolution memory 160, which corresponds to the x- and y-coordinates of the high-resolution data in the high-resolution cache 156, is ascertained in a step 230. Then, in step 232, the low-resolution representation determined in step 226 is received into the low-resolution memory location determined in step 230. Control is then passed to step 236.

If, on the other hand, the image location of the high-resolution data in the high-resolution cache 156 does match the image location of the current section, the previous high-resolution data is received from the high-resolution cache into the image processor 122 in a step 234. Then, control is passed to step 246.

In step 236, the x- and y-coordinates of the image location, which correspond to the pixel of interest, are received into the corresponding location within the high-resolution cache 156.

Previous low-resolution image data, corresponding to a previously processed section at the current image location, is received from the low-resolution memory 160 into the image processor 122 in a step 240. A high-resolution representation of the low-resolution data, received into the image processor 122 in the step 236, is determined in a step 242. Then, a high-resolution representation of the low-resolution data from the current section is determined and received into the image processor 122 in a step 244. Converting the low-resolution to high-resolution data may be done by any of a number of ways. In the preferred embodiment it is converted merged according to methods set forth in U.S. Ser. No. 09/097,092, filed Jun. 11, 1998, which is hereby incorporated by reference.

The two (2) high-resolution representations in the image processor 122 are merged in a step 246. The merged data, which results from step 246, is then received from the image processor 122 into the location within high-resolution cache 156, which corresponds to the image location of the current section, in a step 250. Lastly, the location within high-resolution cache 156, which corresponds to the image location of the current section, is set as "valid" in a step 252. Then, in step 254 control is returned to step 200 to process the next section.

While text and pictorials could be processed in like manner to synthetic graphics, this would be undesirably slow. Instead, pictorials are processed by writing pictorial data directly into the low-resolution frame buffer, while clearing any valid bits belonging to pixels in corresponding parts of the high resolution cache.

In like fashion, text avoids the high resolution cache, except to clear any affected valid bits. However, while pictorials have no need for high resolution information, text is first rasterized at high resolution, then filtered down to low resolution, and stored in a low resolution character cache. Low resolution, filtered characters are then combined with the low resolution frame buffer using alpha blending. That is, the resolution character cache contains (typically 8 bit) values indicating the mask information, which is combined with the current color information and the color in the low resolution frame buffer to provide the new color which is written into the frame buffer. In those mask pixels whose value is full on, the new color is written directly to the frame buffer. In those mask pixels whose value is 0, the frame buffer is left unchanged. In the remaining mask pixels, some intermediate value, $\alpha$, is used in the equation:

$$\text{new value} = \text{old value} + \alpha(\text{current color} - \text{old value})$$

Figure 12:
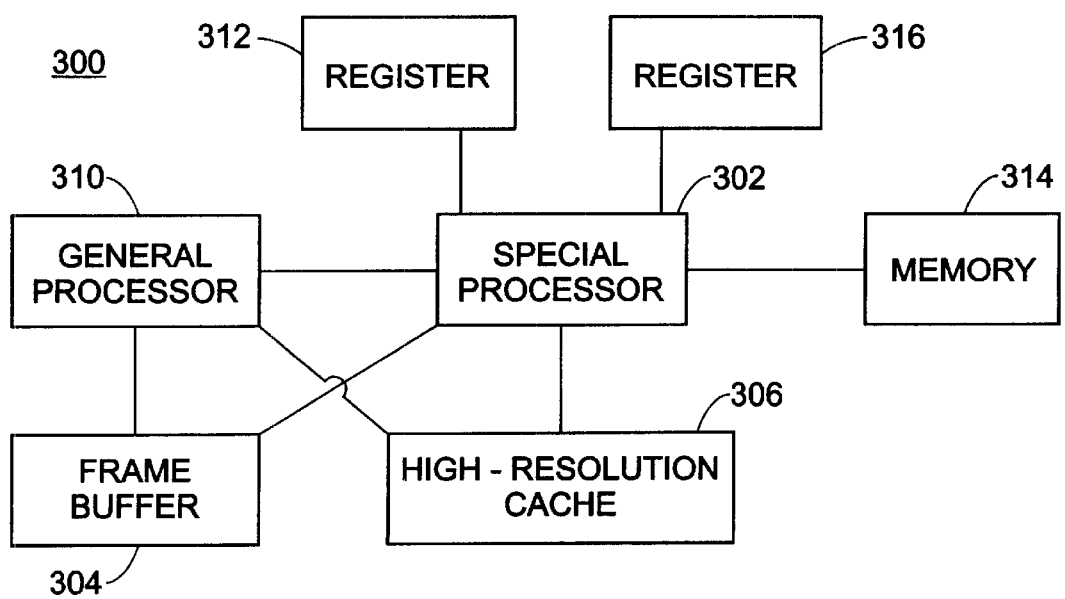
FIG. 12 illustrates an alternate embodiment of components included within the computing device shown in FIG. 5.

A second embodiment of the computing device according to the present invention is illustrated in FIG. 12. With reference to FIG. 12, the computing device 300 includes a specialized processor 302, which provides the function of antialiasing data written into a frame buffer memory 304. The computing device 300 maintains a high resolution cache 306 as described above for the first embodiment. The cache 306 is maintained as some form of associative memory which can readily indicate whether a given address maps to any cache location. In this embodiment, the addresses are mapped using a hashing scheme as described above. However, other possible mapping implementations are also contemplated.

The specialized processor 302 receives commands from a general processor 310 requesting the specialized processor 302 to a) set the current color, b) set the entire low resolution pixel at some address to the current color, (i) with or (ii) without alpha blending c) set a single high resolution pixel at some address to the current color, d) set all pixels in a sub-rectangle of a high resolution block to the current color, or e) initiate a DMA copy of a block of pixels representing a pictorial, possibly rotating the block while copying. In case d), only sub-rectangles that are either (i) above and to the left, (ii) above and to the right, (iii) below and to the left, or (iv) below and to the right of a specified pixel may be specified (including a specification of which of these four cases). Thus the specialized processor 302 recognizes at least six op-codes, all of which include operands.

The specialized processor 302 maintains the high resolution cache 306, and hides from the general purpose processor 310 the details of scaling low resolution pixels to high resolution form. Also, the specialized processor 302 maintains an instruction queue, allowing the general purpose processor 310 to continue with other operations without waiting for graphical operations to complete, and allowing the special purpose processor 302 to execute non-conflicting operations without waiting for memory reads and writes to be complete.

When the specialized processor 302 receives a "set color" command, the processor 302 stores a value of the "set color" command's first operand in an internal register 312.

When the specialized processor 302 receives a "set low" command, the specialized processor 302 initiates a write operation to the low resolution frame buffer memory 304 at the destination indicated by the first and second operands, using the value in the internal register 312. The specialized processor 302 also tests the high-resolution cache 306 to determine whether the destination location is in the cache 306, in which case the processor 302 clears the "cache valid" flag of the corresponding location.

When the specialized processor 302 receives a "set low with alpha" command, the processor 302 compares the value in the third operand of the command to 0 and to all ones, and in the former case, does nothing further. In the latter case the processor 302 proceeds as if a regular "set low" code had been received. In the remaining cases (all other values of alpha), the processor 302 first initiates a read from a memory corresponding to the location in the first and second operands into an internal register 316. The specialized processor 302 then combines the value in the register 312 with the value in the register 316, weighted by the contents of the third operand of the command. After combining the two values, the result is written back to the memory 314 at the same location. In the preferred embodiment, the combining operation applies the mathematical expression described above for alpha blending. However, other methods, including approximations using a table lookup, are also contemplated.

When the specialized processor 302 receives a "set high resolution pixel" command it tests the high-resolution cache 306 for the location identified by the first and second operands of the command (with low order bits masked off)—the target location. If the cache 306 contains the target location, it sets the pixel within a cache block at that location to the current color in the register 312. If the high-resolution cache 306 does not contain the target location, it forms averages of any of the eight neighbors of the target location, which are in the cache 306. Then the specialized processor 302 initiates reads of the remaining neighbors, along with the target location-itself, from the low resolution buffer 304. With these nine values, the specialized processor 302 forms a scaled-up version of the target location. The specialized processor 302 also forms the average of the location in the cache 306 to which the target location will map after the operation, and writes that average to the low resolution memory 304 at the location mapping to the cache location before the operation. Once the scaled-up version is available, the specialized processor 302 replaces the location in the scaled-up version indicated by the low order bits of the first two operands with the value in the register 312.

When the specialized processor 302 receives a "set high resolution rectangle" command it performs essentially the same operations as for "set high resolution pixel", except that it also decodes the rectangle instructions to determine which of the high resolution pixels are to be set. The specialized processor 302 then sets all those pixels to the current color when it obtains a high resolution version of the location (either from the cache or by scaling).

When the specialized processor 302 receives a "DMA write" command, the processor 302 sets a first register "DA" to the value of the first operand of the command: this first register is used as the starting location for the data copy. The processor 302 sets a second register "DL" to the value of the second operand of the command: this is used as a scanline length during the copy. The processor 302 sets a third register "DN" to the value of the third operand of the command: this is the number of scanlines in the copy; and it sets a fourth register "DS" to the value of the fourth operand of the command: this is the number of bytes between starts of successive scanlines in the input. The remaining two operands specify the X and Y location in the frame buffer 304 of the starting destination location. These remaining two operands are stored in registers DX and DY. With all registers initialized, the specialized processor 302 begins a direct memory copy, in which it reads values at memory locations within the address space of general processor 310 specified by DA, incrementing DA and decrementing DL with every read. The specialized processor 302 then writes the values at X and Y locations DX and DY, incrementing DX with every write. When DN becomes zero, DX is set back to the value in the fifth operand, DY is incremented, DL is set back to the value of the third operand, DA is increased by DS-DL, and DN is decremented. When DN reaches 0, the copy ceases.

In a third embodiment, a specialized processor offers a DMA with alpha operation which combines the effects of the DMA write with the set low resolution with alpha.

The invention has been described with reference to the preferred embodiment. Obviously, modifications and alterations will occur to others upon reading and understanding the preceding detailed description. It is intended that the invention be construed as including all such modifications and alterations insofar as they come within the scope of the appended claims or the equivalents thereof.

Having thus described the preferred embodiment, the invention is now claimed to be:

1. A method of generating an antialiased image including at least one object, comprising:
   1) receiving current data describing each of the at least one objects into a processing buffer;
   2) determining if portions of the current data represent edges;
   3) rasterizing portions of the current data representing edges of the at least one objects;
   4) receiving the rasterized data into a high resolution cache;
   5) transforming the rasterized data in the high resolution cache into low resolution data when: (i) data in the high resolution cache is valid, and (ii) an image location of data in the high resolution cache is the same as an image location of a current section being processed; and
   6) receiving at least one of the current data and the rasterized data into a low resolution memory.

2. The method of generating an image as set forth in claim 1, wherein the step 1 of receiving the current data includes:
   7) identifying a current section of a current object to be processed; and
   8) determining a current location identifier associated with the current section, the current location identifier identifying a position of the current section within the image.

3. The method of processing an image as set forth in claim 2:
   wherein the step 5 includes:
      9) determining a first memory location, within the low-resolution memory, as a function of the current location identifier; and
      10) receiving the current data into the first memory location of the low-resolution memory;
   the method further including:
      11) determining a second memory location, within the high-resolution cache, as a function of the current location identifier; and
      12) if the previous high-resolution data included in the second memory location corresponds to the same location within the image as the current location identifier, flagging the second memory location as invalid.

4. The method of processing an image as set forth in claim 3, further including:
   if the previous high-resolution data stored in the second memory location of the high-resolution cache is flagged as valid:

13) identifying a previous image location associated with the previous high-resolution data stored in the second memory location;

14) determining a low-resolution version of the high-resolution data stored in the second memory location;

15) determining a third memory location, within the low-resolution memory, as a function of the previous image location; and 16) receiving the low-resolution version of the high-resolution data stored in the second memory location of the high-resolution memory into the third memory location of the low-resolution memory;

if the previous high-resolution data stored in the second memory location of the high-resolution cache is flagged as one of valid and invalid:

17) identifying the second memory location as corresponding to the current section;

18) receiving previous low-resolution image data, corresponding to the previous section of the previously processed object at the same location of the current image, from the low-resolution memory into the processing buffer;

19) determining a previous high-resolution representation of the previous low-resolution image data in the processing buffer;

20) merging the high-resolution version of the current low-resolution data with the previous high-resolution representation in the processing buffer;

21) receiving the merged data from the image buffer into the second memory location of the high-resolution cache; and 22) flagging the second memory location of the high-resolution cache as valid.

5. The method of processing an image as set forth in claim 1 further including:

7) after each of the data for each of the objects is processed, outputting the processed data in the high-resolution cache and the low-resolution memory to a color printing device.

6. A method of generating an antialiased image including at least one object, comprising:

1) receiving current data describing each of the at least one objects into a processing buffer;

2) rasterizing portions of the current data representing edges of the at least one objects;

3) receiving the rasterized data into a high resolution cache;

4) transforming the rasterized data in the high resolution cache into low resolution data; and, 5) receiving at least one of the current data and the rasterized data into a low resolution memory;

wherein if the current section does include at edge, further including:

6) determining if previous high-resolution data is included in the high-resolution cache;

if the previous high-resolution data is included in the high-resolution memory and the previous high-resolution data corresponds to a previous section of a previously processed object, the previous section having a same location within the image as the current section:

7) merging the previous high-resolution data with a high-resolution version of the current data; and 8) receiving the merged data from the step 7 into the high-resolution cache;

if the previous high-resolution data is included in the high-resolution cache and the previous high-resolution data corresponds to a previous section of a previously processed object, the previous section having a different location within the image as the current section:

9) receiving a low-resolution version of the previous high-resolution data from the high-resolution memory into the low-resolution memory;

10) receiving original low-resolution data from the low-resolution memory into the processing buffer, the original low-resolution data corresponding to the same location within the image as the current section;

11) merging a high-resolution version of the original low-resolution data with the high-resolution version of the current data; and 12) receiving the merged data from the step 11 into the high-resolution memory;

if the previous high-resolution data is not included in the high-resolution memory:

13) receiving the high-resolution version of the current data in the high-resolution cache.

7. The method of generating an image as set forth in claim 6, if the current section does not include an edge, the step 5 including:

14) receiving the current data into the low-resolution memory.

8. The method of processing an image as set forth in claim 6, wherein the step 6 of determining if the high-resolution memory includes the previous high-resolution data includes:

14) determining if the second memory location within the high-resolution memory includes the previous high-resolution data further including:

15) storing the merged data in the second memory location of the high-resolution cache.

9. A method of processing an antialiased image including at least one object, comprising:

1) receiving current data describing each of the at least one objects into a processing buffer;

2) rasterizing portions of the current data representing edges of the at least one objects;

3) receiving the rasterized data into a high resolution cache;

4) transforming the rasterized data in the high resolution cache into low resolution data;

5) receiving at least one of the current data and the rasterized data into a low resolution memory; and, 6) alpha-blending data previously in the low-resolution memory and that which is received in step 5.

10. A system for processing a color image, comprising:

a high-resolution cache for storing high-resolution data;

a low-resolution memory, connected to the high-resolution cache, for storing low-resolution data, the low-resolution memory being capable of storing at least as much data as the high-resolution cache;

means for determining if portions of a current segment of the image represent an interior or edge portion of the object; and, an image processor, connected to both the high-resolution cache and the low-resolution memory, for receiving sequential segments of low-resolution and high resolution image data, as the image processor receives a current segment of the image data, the image processor one of 1) transmitting the current segment of image data to the low-resolution memory and 2) transmitting the high-resolution data to the high-resolution cache.

11. The system for processing the color image as set forth in claim 10, wherein the image processor transmits any portion of the current segment of the image data to the low-resolution memory if that portion of the current segment represents the interior of the object, and transmits edge portions of the current segment as high-resolution data to the high-resolution cache.

12. The system for processing the color image as set forth in claim 11, the image processor further including:
means for determining image coordinates of the current segment, the image coordinates identifying a position of the current segment within the image;
means for determining a first location within the low-resolution memory as a function of the image coordinates; and
means for determining a second location within the high-resolution cache as a function of the image coordinates, the image processor one of 1) transmitting the current segment of image data to the first location within the low-resolution memory and 2) transmitting the current segment to the second location within the high-resolution cache.

13. The system for processing the color image as set forth in claim 10, further including:
means for outputting the low-resolution data in the low-resolution memory and the high-resolution data in the high-resolution cache to a color output device.

14. A system for processing a color image, comprising:
a high-resolution cache for storing high-resolution data;
a low-resolution memory, connected to the high-resolution cache, for storing low-resolution data, the low-resolution memory being capable of storing at least as much data as the high-resolution cache; and,
an image processor, connected to both the high-resolution cache and the low-resolution memory, for receiving sequential segments of low-resolution and high resolution image data, as the image processor receives a current segment of the image data, the image processor one of 1) transmitting the current segment of image data to the low-resolution memory and 2) transmitting the high-resolution data to the high-resolution cache, wherein the image processor transmits any portion of the current segment of the image data to the low-resolution memory if that portion of the current segment represents the interior of the object, and transmits edge portions of the current segment as high-resolution data to the high-resolution cache, said image processor including:
means for determining image coordinates of the current segment, the image coordinates identifying a position of the current segment within the image;
means for determining a first location within the low-resolution memory as a function of the image coordinates;
means for determining a second location within the high-resolution cache as a function of the image coordinates, the image processor one of 1) transmitting the current segment of image data to the first location within the low-resolution memory and 2) transmitting the current segment to the second location within the high-resolution cache; and,
means for flagging data stored in the second location within the high-resolution cache as one of valid and invalid, if the current segment of the image data is transmitted to the first location within the low-resolution memory, the means for flagging setting the data stored in the second location within the high-resolution cache as invalid.

15. The system for processing the color image as set forth in claim 14, the image processor further including:
means for determining, before new high-resolution data is stored in the second location, if previous data stored in the second location within the high-resolution cache is valid; and
means for transforming valid previous data in the second location within the high-resolution cache to previous low-resolution data and transmitting the previous low-resolution data to the first location within the low-resolution memory.

16. The system for processing the color image as set forth in claim 15, the image processor further including:
means for retrieving previous low-resolution data from the low-resolution memory, the previous low-resolution data corresponding to the image coordinates of the current section;
means for transforming the previous low-resolution data into previous high-resolution data;
means for merging the previous high-resolution data and the current data segment; and
means for transmitting the merged data to the second location within the high-resolution cache and flagging the second location within the high-resolution cache as valid.

17. A system for processing a color image, comprising:
a high-resolution cache for storing high-resolution data;
a low-resolution memory, connected to the high-resolution cache, for storing low-resolution data, the low-resolution memory being capable of storing at least as much data as the high-resolution cache;
an image processor, connected to both the high-resolution cache and the low-resolution memory, for receiving sequential segments of low-resolution and high resolution image data, as the image processor receives a current segment of the image data, the image processor one of 1) transmitting the current segment of image data to the low-resolution memory and 2) transmitting the high-resolution data to the high-resolution cache; and,
means for processing op-codes for instructing a special processor to process the low-resolution data of the current section, the op-codes including a set color command, a set low command, a set low with alpha command, a set high resolution pixel command, a set high resolution rectangle command, and a DMA write operation command.

18. A method of generating an antialiased image including at least two objects, all of a plurality of data for a first one of the objects being processed before any of a plurality of data for a second one of the objects is processed, wherein at least part of the image is stored in a low resolution frame buffer and at least part of the image is stored in a high resolution cache, comprising, for each of the data of each of the objects:
1) receiving data of a current section into a special processor, the current section being a part of a current object being processed;
2) receiving an op-code into the special processor from a general processor, the op-code instructing the special processor for processing the data of the current section; and
3) executing the op-code.

19. The method of processing an image as set forth in claim 18, wherein the op-code is one of a group of instructions including a set color command, a set low command, a set low with alpha command, a set high resolution pixel command, a set high resolution rectangle command, and a DMA write command, the executing step including:
- 4) if the op-code is the set color command, storing a first operand of the set color command in a first internal register;
- 5) if the op-code is the set low command, a special processor writing the contents of the first internal register to a low-resolution frame buffer;
- 6) if the op-code is the set low with alpha command, the special processor determining whether to execute instructions associated with the set low command;
- 7) if the op-code is the set high resolution pixel command:
  - 8) testing if a high-resolution cache includes data at a target location;
  - 9) if the data is included in the target location, writing the low-resolution data to the target location; and
  - 10) if the data is not included in the target location, identifying neighbors of the target location, reading neighboring data from the low-resolution frame buffer, and scaling-up the low-resolution data and the neighboring data,
- 11) if the op-code is the set high-resolution rectangle command:
  - 12) testing if a high-resolution cache includes data at a target location;
  - 13) if the data is included in the target location, writing the contents of the first register to the target location;
  - 14) if the data is not included in the target location, identifying neighbors of the target location, reading neighboring data from the low-resolution frame buffer, scaling-up the low-resolution data and the neighboring data; and
  - 15) determining pixels to be set for a high-resolution rectangle; and
- 16) if the op-code is the DMA write command:
  - 17) copying data from a general processor's memory space to the low resolution memory.

20. The method of processing an image as set forth in claim 19, the step 6 including:
- 18) comparing an operand of the command to all zero's;
- 19) comparing an operand of the command to all one's;
- 20) if the operand includes all zero's, determining not to execute instructions associated with the set low command;
- 21) if the operand includes all one's, determining to execute instructions associated with the set low command; and
- 22) if the operand does not one of include all zero's and include all one's:
  - 23) reading data from a memory;
  - 24) combining a value in the first internal register, weighted by a contents of a third operand of the command, with the data read from the memory; and
  - 25) writing the combined data to the memory.

21. The method of processing an image as set forth in claim 19, the step 17 including:
- 18) determining a starting location for a data copy;
- 19) determining a scanline length to be used during the data copy;
- 20) determining a number of scanlines to be used during the data copy; and
- 21) determining a number of bytes to be used between successive scanlines.

* * * * *